(12) United States Patent
Tomlin

(10) Patent No.: US 10,866,792 B1
(45) Date of Patent: Dec. 15, 2020

(54) SYSTEM AND METHODS FOR RULES-BASED CLEANING OF DEPLOYMENT PIPELINES

(71) Applicant: Palantir Technologies Inc., Palo Alto, CA (US)

(72) Inventor: Luke Tomlin, London (GB)

(73) Assignee: Palantir Technologies Inc., Palo Alto, CA (US)

(*) Notice: Subject to any disclaimer, the term of this patent is extended or adjusted under 35 U.S.C. 154(b) by 112 days.

(21) Appl. No.: 15/955,425

(22) Filed: Apr. 17, 2018

(51) Int. Cl.
  *G06F 9/445* (2018.01)
  *G06F 8/60* (2018.01)
  *G06F 8/71* (2018.01)

(52) U.S. Cl.
  CPC . *G06F 8/60* (2013.01); *G06F 8/71* (2013.01)

(58) Field of Classification Search
  CPC .................................. G06F 8/60; G06F 8/71
  USPC ........................................................ 717/174
  See application file for complete search history.

(56) References Cited

U.S. PATENT DOCUMENTS

| | | | |
|---|---|---|---|
| 6,057,757 A | 5/2000 | Arrowsmith et al. | |
| 6,643,613 B2 | 11/2003 | McGee et al. | |
| 7,028,223 B1 | 4/2006 | Kolawa et al. | |
| 7,117,430 B2 | 10/2006 | Maguire et al. | |
| 7,739,246 B2 | 6/2010 | Mooney et al. | |
| 7,877,421 B2 | 1/2011 | Berger et al. | |
| 8,601,326 B1 | 12/2013 | Kirn | |
| 8,627,328 B2 * | 1/2014 | Mousseau | G06F 9/50 718/104 |
| 8,799,867 B1 | 8/2014 | Peri-Glass et al. | |
| 8,924,389 B2 | 12/2014 | Elliot et al. | |
| 8,938,434 B2 | 1/2015 | Jain et al. | |
| 9,229,952 B1 * | 1/2016 | Meacham | G06F 16/2386 |
| 9,230,060 B2 | 1/2016 | Friedlander et al. | |
| 9,338,013 B2 | 5/2016 | Castellucci et al. | |
| 9,348,851 B2 | 5/2016 | Kirn | |
| 2002/0194058 A1 | 12/2002 | Eldering | |
| 2003/0088438 A1 | 5/2003 | Maughan et al. | |
| 2003/0171942 A1 | 9/2003 | Gaito | |

(Continued)

FOREIGN PATENT DOCUMENTS

| | | |
|---|---|---|
| AU | 2014203669 | 5/2016 |
| DE | 102014213036 | 1/2015 |

(Continued)

OTHER PUBLICATIONS

Title: Test orchestration a framework for continuous integration and continuous deployment author: N Rathod et al, published on 2015.*

(Continued)

*Primary Examiner* — Chameli Das
(74) *Attorney, Agent, or Firm* — Sheppard Mullin Richter & Hampton LLP (57) ABSTRACT

Systems and methods are provided for managing datasets and source code of a deployment pipeline. A system obtains a deployment pipeline being associated with one or more datasets and source code, and obtains one or more deployment pipeline cleaning rules. The system applies the one or more deployment pipeline cleaning rules to the deployment pipeline, to identify issues the one or more datasets and issues associated with the source code, and cause generation of a graphical user interface indicating identified issues.

20 Claims, 5 Drawing Sheets

(56) References Cited

U.S. PATENT DOCUMENTS

| | | |
|---|---|---|
| 2004/0117387 A1 | 6/2004 | Civetta et al. |
| 2004/0153837 A1 | 8/2004 | Preston et al. |
| 2005/0102328 A1 | 5/2005 | Ring et al. |
| 2006/0129992 A1 | 6/2006 | Oberholtzer et al. |
| 2006/0161558 A1 | 7/2006 | Tamma et al. |
| 2006/0209085 A1 | 9/2006 | Wong et al. |
| 2008/0104407 A1 | 5/2008 | Horne et al. |
| 2009/0199047 A1 | 8/2009 | Vaitheeswaran et al. |
| 2009/0282097 A1 | 11/2009 | Alberti et al. |
| 2010/0125470 A1 | 5/2010 | Chisholm |
| 2010/0211550 A1 | 8/2010 | Daniello et al. |
| 2010/0228786 A1 | 9/2010 | Torok |
| 2011/0131547 A1 | 6/2011 | Elaasar |
| 2011/0209140 A1* | 8/2011 | Scheidel ............... H04L 67/34 717/172 |
| 2012/0290879 A1 | 11/2012 | Shibuya et al. |
| 2013/0006947 A1 | 1/2013 | Akinyemi et al. |
| 2013/0024731 A1 | 1/2013 | Shochat et al. |
| 2013/0091084 A1 | 4/2013 | Lee |
| 2013/0097130 A1 | 4/2013 | Bingol et al. |
| 2013/0198565 A1 | 8/2013 | Mancoridis et al. |
| 2013/0226879 A1 | 8/2013 | Talukder et al. |
| 2013/0246316 A1 | 9/2013 | Zhao et al. |
| 2013/0266292 A1* | 10/2013 | Sandrew ............... H04N 9/79 386/282 |
| 2014/0156617 A1 | 6/2014 | Tomkins |
| 2014/0189641 A1* | 7/2014 | Anderson ............... G06F 8/71 717/110 |
| 2015/0012509 A1 | 1/2015 | Kirn |
| 2015/0026121 A1* | 1/2015 | Shani ............... G06F 16/24578 707/609 |
| 2015/0112641 A1 | 4/2015 | Faraj |
| 2015/0188715 A1 | 7/2015 | Castellucci et al. |
| 2015/0220426 A1* | 8/2015 | Spektor ............... G06F 8/71 717/131 |
| 2015/0277901 A1* | 10/2015 | Karle ............... G06Q 10/00 717/120 |
| 2016/0019096 A1* | 1/2016 | Winterfeldt ........... G06F 9/5066 717/177 |
| 2017/0003948 A1* | 1/2017 | Iyer ............... H04L 43/045 |
| 2017/0180459 A1* | 6/2017 | Frank ............... H04L 67/10 |
| 2017/0269921 A1* | 9/2017 | Martin Vicente ......... G06F 8/61 |
| 2017/0277416 A1* | 9/2017 | Bohling, III ............ G06F 16/11 |

FOREIGN PATENT DOCUMENTS

| | | |
|---|---|---|
| EP | 1566758 | 8/2005 |
| EP | 1962222 | 8/2008 |
| EP | 2551799 | 1/2013 |
| EP | 2897051 | 7/2015 |
| GB | 2517582 | 2/2015 |
| NL | 2013134 | 1/2015 |
| WO | WO 2005/010685 | 2/2005 |
| WO | WO 2011/017289 | 5/2011 |
| WO | WO 2011/071833 | 6/2011 |
| WO | WO 2012/079836 | 6/2012 |
| WO | WO 2013/067077 | 5/2013 |

OTHER PUBLICATIONS

Title: Securing a deployment pipeline; author: L Bass; published on 2015.*

Title: Security support in continuous deployment pipeline; author: F Ullah, Published on 2017.*

Geiger, Jonathan G., "Data Quality Management, The Most Critical Initiative You Can Implement", Data Warehousing, Management and Quality, Paper 098-29, SUGI 29, Intelligent Solutions, Inc., Bounder, CO, pp. 14, accessed Oct. 3, 2013.

Johnson, Steve, "Access 2013 on demand," Access 2013 on Demand, May 9, 2013, Que Publishing.

Pythagoras Communications Ltd., "Microsoft CRM Duplicate Detection," Sep. 13, 2011, https://www.youtube.com/watch?v=j-7Qis0D0Kc.

* cited by examiner

SYSTEM AND METHODS FOR RULES-BASED CLEANING OF DEPLOYMENT PIPELINES

FIELD OF THE INVENTION

This disclosure relates to approaches for managing datasets and source code of a deployment pipeline.

BACKGROUND

Under some approaches, software deployments may be managed using deployment pipelines. For example, deployment pipelines may be used to manage datasets of a deployment, source code of a deployment, and/or the like. As software deployments increase in size, and/or as changes accrue, various problems can arise. For example, datasets may not conform to naming conventions, datasets may become outdated, source code may include broken branches, and/or the like.

SUMMARY

Various embodiments of the present disclosure can include systems, methods, and non-transitory computer readable media. In some embodiments, a system obtains a deployment pipeline associated with one or more datasets and source code, and obtains one or more deployment pipeline cleaning rules. The system applies the one or more deployment pipeline cleaning rules to the deployment pipeline, and identifies one or more first issues associated with at least one dataset of the one or more datasets associated with the deployment pipeline. The identifying may be based on the applying the one or more deployment pipeline cleaning rules to the deployment pipeline. The system may identify one or more second issues associated with the source code associated with the deployment pipeline, and the identifying may be based on the applying the one or more deployment pipeline cleaning rules to the deployment pipeline. Then, the system may cause generation of a graphical user interface indicating the one or more first issues and the one or more second issues.

In some embodiments, the one or more first issues associated with the at least one dataset include any of an invalid dataset name, invalid data type, and stale data. In some embodiments, the one or more second issues associated with the source code include any of broken branches and invalid mapping of the source code within the deployment pipeline.

In some embodiments, the system further updates at least one of the one or more deployment pipeline cleaning rules in response to user input. In some embodiments, the system further creates one more additional deployment pipeline cleaning rules in response to user input. In some embodiments, any of the first or second issues are identified periodically or in real-time. In some embodiments, the system further suggests the one or more deployment pipeline cleaning rules to apply to the deployment pipeline based on analysis of one more other deployment pipelines.

In some embodiments, the system further tests the one or more deployment pipeline cleaning rules, and modifies at least one of the one or more deployment pipeline cleaning rules base on a test result. In some embodiments, the system further fixes the one or more first issues and the one or more second issues. In some embodiments, the system further detects an event to trigger deployment pipeline cleaning, and applies the one or more deployment pipeline cleaning rules to the deployment pipeline upon detection of the event, and the event includes at least one of a real-time user input to name a dataset, a user input to start the deployment pipeline cleaning, and passage of a preset timing.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

A claimed solution rooted in computer technology overcomes problems specifically arising in the realm of computer technology. In various implementations, a computing system is configured to obtain a deployment pipeline. The deployment pipeline may be associated with one or more datasets and source code. One or more deployment pipeline cleaning rules may be obtained, and the rules may be applied to the deployment pipeline. For example, the deployment pipeline cleaning rules may be applied automatically (e.g., periodically or continuously), in response to user-input, and/or the like. One or more first issues associated with at least one dataset of the one or more datasets may be identified (e.g., invalid dataset names, invalid data types, stale data). The identification may be based on the one or more deployment pipeline cleaning rules. For example, the deployment pipeline cleaning rules may define valid naming conventions, valid data types, rule triggers, and/or the like. One or more second issues associated with the source code may be identified (e.g., broken branches or invalid mapping of the source code within the deployment pipeline). The identification may be based on the one or more deployment pipeline cleaning rules. The system may cause a graphical user interface to be generated indicating the one or more first issues and the one or more second issues. For example, graphical icons and/or messages may be generated, which may then be displayed to a user. The user and/or system may take one or more actions to address the issues. For example, the system may automatically rename datasets, inform the user of broken branches, and/or the like.

Figure 1:
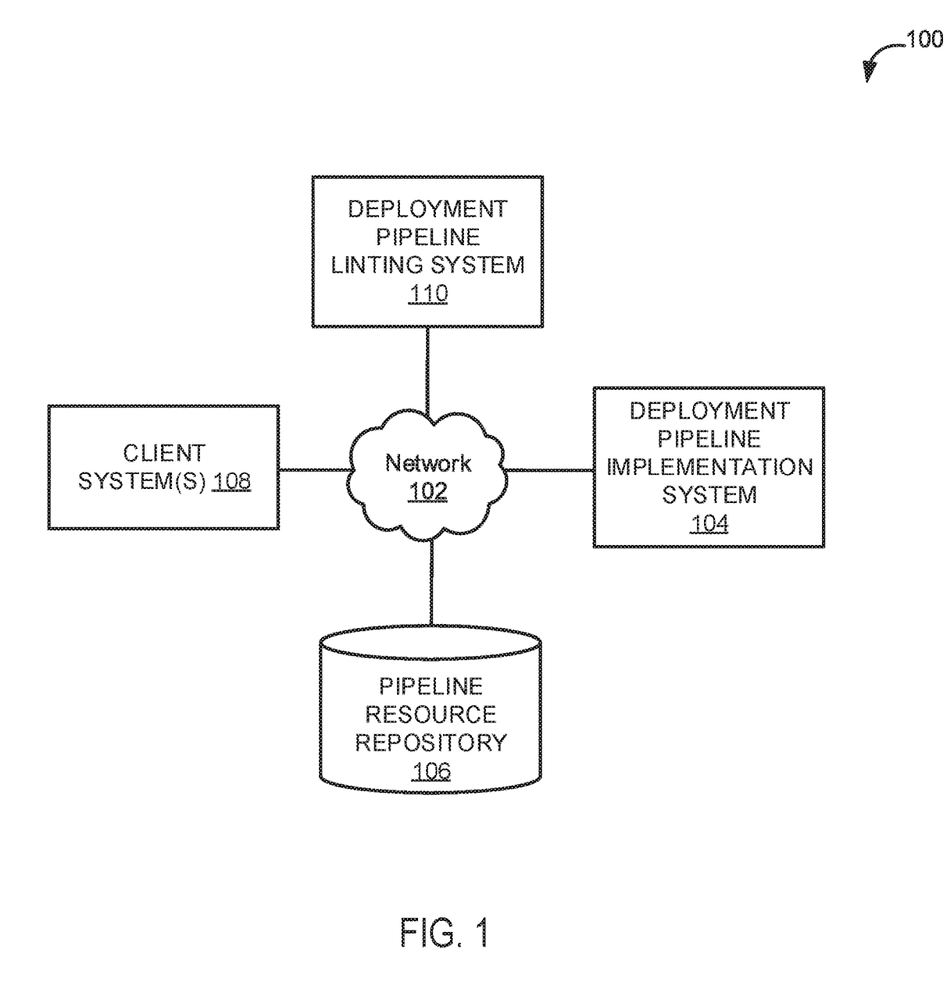
FIG. 1 illustrates an example of an architecture of a deployment pipeline management system for managing datasets and source code of a deployment pipeline according to some embodiments.

FIG. 1 illustrates an example of an architecture of a deployment pipeline management system 100 for managing datasets and source code of a deployment pipeline according to some embodiments. The datasets and source code may be referred to individually or collectively as "pipeline resources." Source code may include computing instructions that may be compiled, assembled, interpreted, executed and/or the like. Source code may be human-readable and/or machine-readable. For example, the source code may comprise instructions for performing data integration operations associated with the one or more datasets (e.g., the datasets may be input datasets, outputs datasets, and/or the like). In the example shown in FIG. 1, the deployment pipeline management system 100 includes a deployment pipeline implementation system 104, pipeline resource repository 106, one or more client systems 108, and a deployment pipeline linting system 110. The pipeline resource repository 106 is illustrated in FIG. 1 as separate from the deployment pipeline implementation system 104, the client system(s) 108, and the deployment pipeline linting system 110. In implementations, pipeline resource repository 106 may be stored on the deployment pipeline implementation system 104, the client system(s) 108, or the deployment pipeline linting system 110, or at a remote location.

In the example of the system shown in FIG. 1, the network 102 is intended to represent a computer communication network to connect various applicable computer components including those illustrated in FIG. 1. In a specific implementation, the network 102 may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

In the example of the system shown in FIG. 1, the deployment pipeline implementation system 104 is intended to represent a computer system configured to implement a deployment pipeline. In some embodiments, a deployment pipeline includes a chain of processing elements (or, "stages"), such as processes, threads, functions, etc., and the output of each processing elements may be an input of one or more other stages (e.g., the next stage). In some embodiments, one or more datasets are associated with a deployment pipeline, and datasets may include input data to be input to the deployment pipeline, output data output from the deployment pipeline, and parameter data used in implementation of the deployment pipeline. In some embodiments, a dataset may include data associated with a user having access to the deployment pipeline management system 100, and derivative datasets such as data indicating relationship between other datasets, and so on. In some embodiments, by implementing the deployment pipeline, the deployment pipeline implementation system 104 is configured to perform various applicable computing functions, including data analysis, data screening, data integration, and so on. For example, data screening may include extraction of patterns in a large number of datasets, employing various applicable computing techniques, such as machine learning (e.g., deep learning, artificial neural networks). In some embodiments, results of the computing functions performed by the deployment pipeline implementation system 104 may be used for various applicable purposes, such as marketing, investigation, research, business decision making, and so on.

In the example of the system shown in FIG. 1, the pipeline resource repository 106 is intended to represent datastore configured to store pipeline resources. In some embodiments, the pipeline resources include datasets and source code. In some embodiments, the pipeline resource repository 106 described herein may be configured in a database including or interfacing to databasesor other data storage, including file-based, or query formats, platforms, or resources such as OLAP (On Line Analytical Processing), SQL (Structured Query Language), a SAN (storage area network), Microsoft Access™ or others may also be used, incorporated, or accessed. The databases may comprise one or more such databases that reside in one or more physical devices and in one or more physical locations. The database may store a plurality of types of data and/or files and associated data or file descriptions, administrative information, or any other data.

In some embodiments, the database includes a referential table in which relationships among datasets are indicated. In a specific implementation, the referential table includes a plurality of entries, and each of the entries correspond to a single dataset. Further, an entry of the referential table may include an identifier and metadata of a dataset, and also may include various relationships with other datasets. For example, in an entry, the various relationships include identifiers of other datasets that matches a specific relationship type with respect to each of a plurality of relationship types (e.g., analysis relationship, modification relationship, user-interaction relationship, etc.), and also includes a proximate degree with respect to each of the related datasets.

In some embodiments, the database includes a referential table in which relationship among stored source code are indicated in a similar manner as the reference table for datasets. In a specific implementation, the referential table includes a plurality of entries, and each of the entries corresponding to a single source code. Further, an entry of the referential table includes an identifier and metadata of a source code, and also include various relationships with other source code. For example, in an entry, the various relationships include identifiers of other source code that match a specific relationship type.

In some embodiments, the pipeline resource repository 106 may comprise a storage device including one or more of random access memory (RAM), read only memory (ROM), and/or other memory. The storage device may store the computer program instructions (e.g., the aforementioned source code) to be executed by a processor as well as datasets that may be manipulated by the processor. The storage device may comprise floppy disks, hard disks, optical disks, tapes, or other storage media for storing computer-executable instructions and/or data.

In the example of the system shown in FIG. 1, one or more of the client system(s) 108 is intended to represent a computer system configured to interact with the deployment pipeline configuration system 104 and/or the deployment pipeline linting system 110 for configuring and linting a deployment pipeline, respectively. In some embodiments, one or more of the client system(s) 108 is configured as a server (e.g., having one or more server blades, processors, etc.), a gaming console, a handheld gaming device, a personal computer (e.g., a desktop computer, a laptop computer, etc.), a smartphone, a tablet computing device, and/or other device that can be programmed to generate and/or receive datasets, analyze datasets, and determine relationships among datasets, and generate and/or receive source code, analyze source code, and determine relationships among source code.

Figure 5:
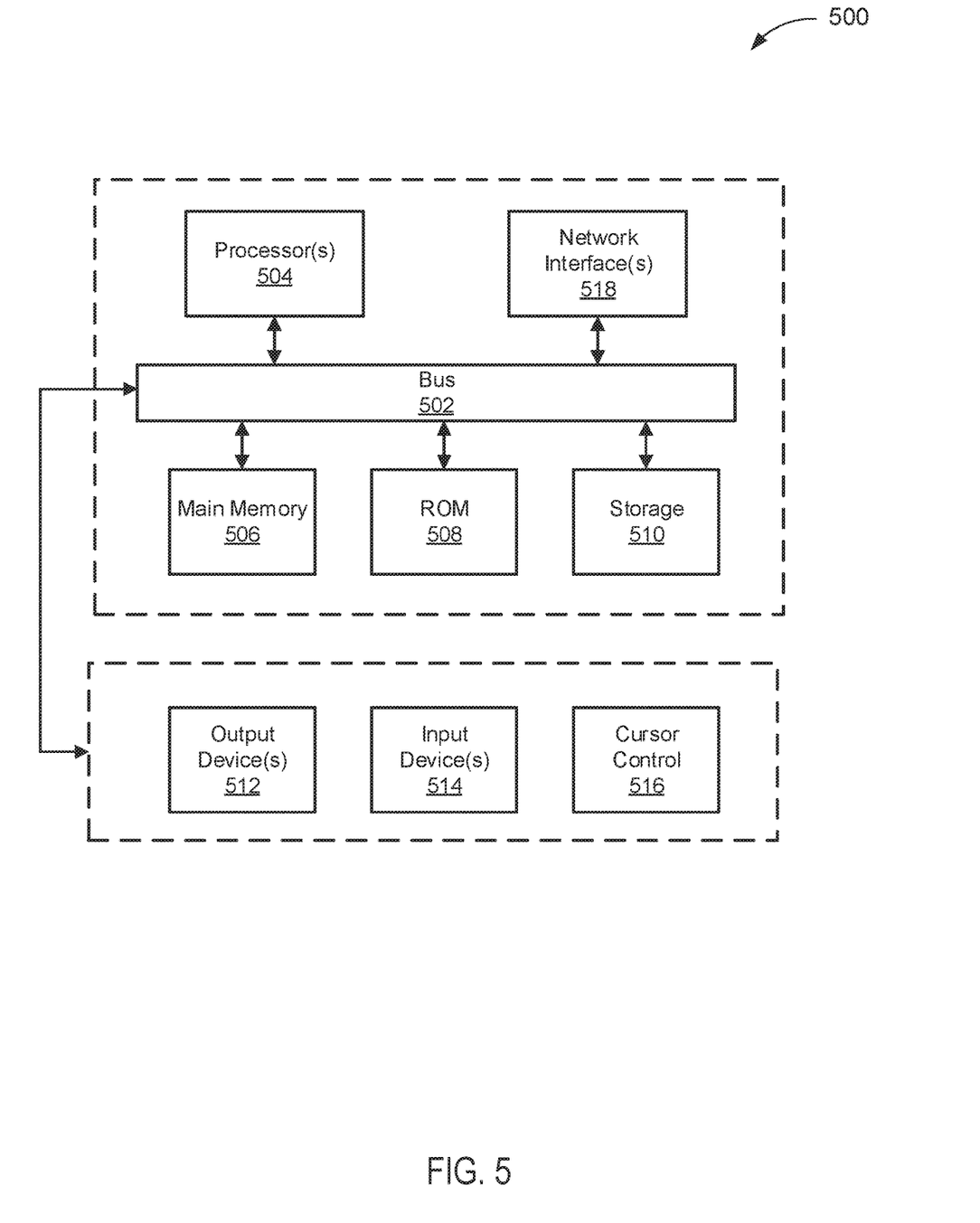
FIG. 5 is a block diagram that illustrates a computer system upon which any of the embodiments described herein may be implemented.

In a specific implementation, one or more of the client system 108 includes one or more processors, one or more storage devices, and/or other components (not shown in FIG. 1). In some embodiments, the processors are programmed by one or more computer program instructions stored on a storage device. In some embodiments, the processors are programmed by a dataset generation and reception module, a dataset parameter extraction module, a dataset parameter analysis module, a graphical user interface (GUI) generation module, and a dataset filtering module, and/or other instructions that program the computer system to perform various applicable operations. As used herein, for convenience, the various applicable instruction modules will be described as performing an operation, when, in fact, various applicable instructions program the processors (and therefore computer system) to perform the various applicable operations. Further details and features of a computer system configured for implementing features of the described invention may be understood with respect to computer system 500 as illustrated in FIG. 5.

In the example of the system shown in FIG. 1, the deployment pipeline linting system 110 is intended to represent a hardware configured to perform deployment pipeline linting on datasets and/or source code associated with a deployment pipeline. In a specific implementation, deployment pipeline linting may include analysis of one or more datasets and/or source code associated with the deployment pipeline. For example, the deployment pipeline linting may flag programming errors, bugs, stylistic errors, suspicious constructs, and so on. In a specific implementation, in performing deployment pipeline linting, the deployment pipeline linting system 110 is configured to set up a deployment pipeline cleaning rule to be applied to one or more datasets and/or source code associated with a deployment pipeline. In a specific implementation, a deployment pipeline cleaning rule specifies one or more conditions to determine that a dataset or a source code is erroneous, one or more conditions to apply the deployment pipeline cleaning rule during the deployment pipeline linting, and one or more conditions to trigger notification of and/or address issues found in the dataset or the source code. In a specific implementation, in setting up a deployment pipeline cleaning rule, the deployment pipeline linting system 110 receives user inputs from the client system 108.

In a specific implementation, in performing deployment pipeline linting, the deployment pipeline linting system 110 is configured to apply the set-up deployment pipeline cleaning rule to one or more datasets and/or source code associated with a deployment pipeline, to identify issues involved in the one or more datasets and/or source code. For example, an issue involved in a dataset may include a naming error of using characters not allowed to be used. In another example, an issue involved in source code may include an inactive state of the source code exceeding a predetermined threshold. In a specific implementation, in performing deployment pipeline linting, the deployment pipeline linting system 110 is configured to notify one or more issues identified through the deployment pipeline linting to an applicable system such as the client system 108. Based on the issues notified from the deployment pipeline linting system 110, a client using the client system 108 may recognize the issue and address the issue. In a specific implementation, in performing deployment pipeline linting, the deployment pipeline linting system 110 is configured to automatically address the one or more issues identified through the deployment pipeline linting. In a specific implementation, in addressing issues, the deployment pipeline linting system 110 may automatically modify, relocate, or remove datasets and/or source code involving the issues, without user interaction to address the issues.

Although illustrated in FIG. 1 as a single component, the deployment pipeline configuration system 104, the client system 108, and the deployment pipeline linting system 110 may each include a plurality of individual components (e.g., computer devices) each programmed with at least some of the functions described herein. In this manner, some components of the deployment pipeline configuration system 104, the client system 108, and/or the deployment pipeline linting system 110 may perform some functions while other components may perform other functions, as would be appreciated. The various instructions described herein are exemplary only. Other configurations and numbers of instructions may be used, so long as the processor of the deployment pipeline configuration system 104, the client system 108, and/or the deployment pipeline linting system 110 are programmed to perform the functions described herein.

Figure 2:
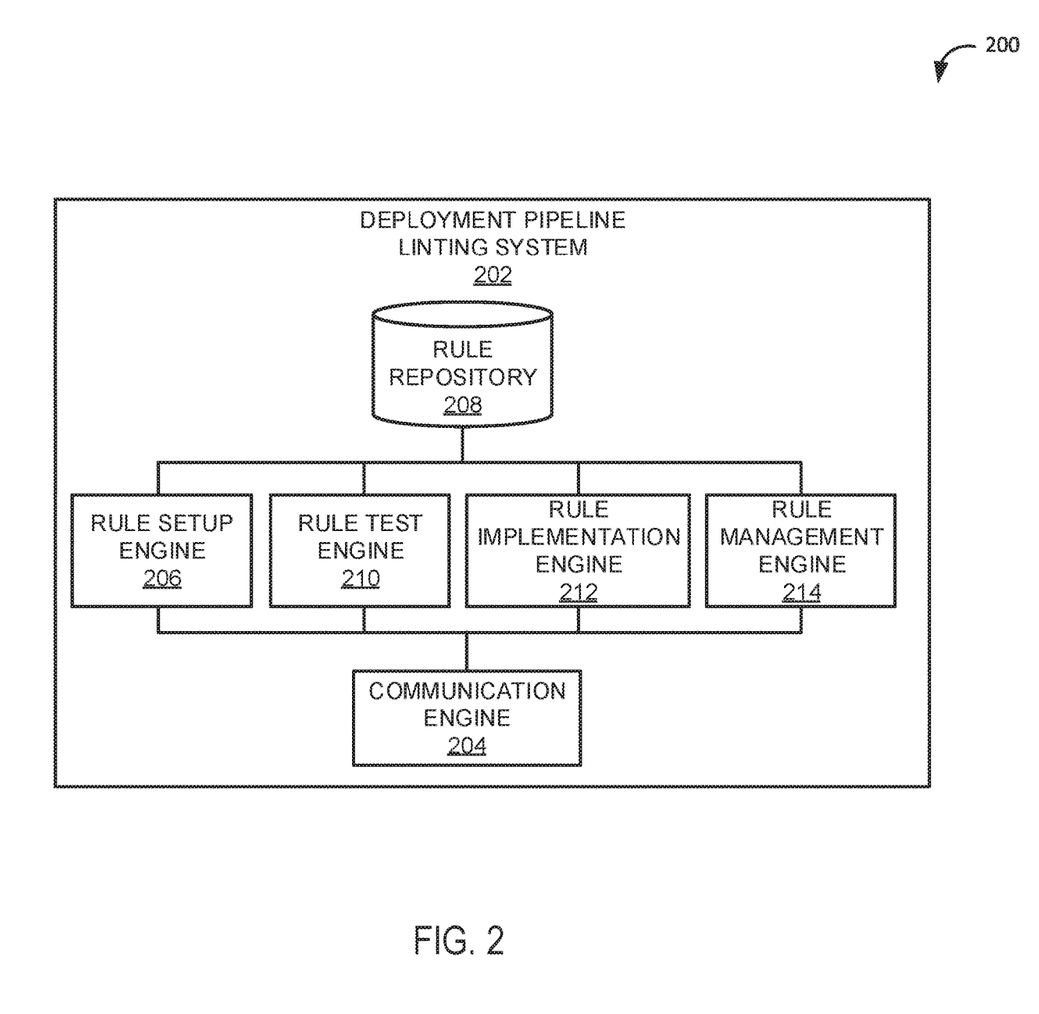
FIG. 2 illustrates an example of an architecture of a deployment pipeline linting system according to some embodiments.

FIG. 2 illustrates an example of an architecture 200 of a deployment pipeline linting system according to some embodiments. The example architecture of a deployment pipeline linting system 202 shown in FIG. 2 includes a communication engine 204, a rule setup engine 206, rule repository 208, a rule test engine 210, a rule implementation engine 212, and a rule management engine 214. In the example architecture shown in FIG. 2, each of the communication engine 204 and the rule setup engine 206 is coupled to the rule setup engine 206, the rule test engine 210, the rule implementation engine 212, and the rule management engine 214. In a specific implementation, the deployment pipeline linting system 202 corresponds to the deployment pipeline linting system 110 in FIG. 1.

The communication engine 204 is intended to represent hardware configured to perform data communication with an external system such as a client system, pipeline resource repository, and a deployment configuration system described in this paper. In a specific implementation, in communicating with a client system, the communication engine 204 is configured to receive user inputs for various applicable purposes. In a specific implementation, a user input includes one indicating a name of a dataset to be put to the dataset. In a specific implementation, a user input includes a string of a code to generate a source code. In a specific implementation, a user input includes a command to start deployment pipeline linting with respect to a deployment pipeline that has been generated. In a specific implementation, a user input includes ones for setting various applicable parameters for setting up a deployment pipeline cleaning rule.

Figure 3:
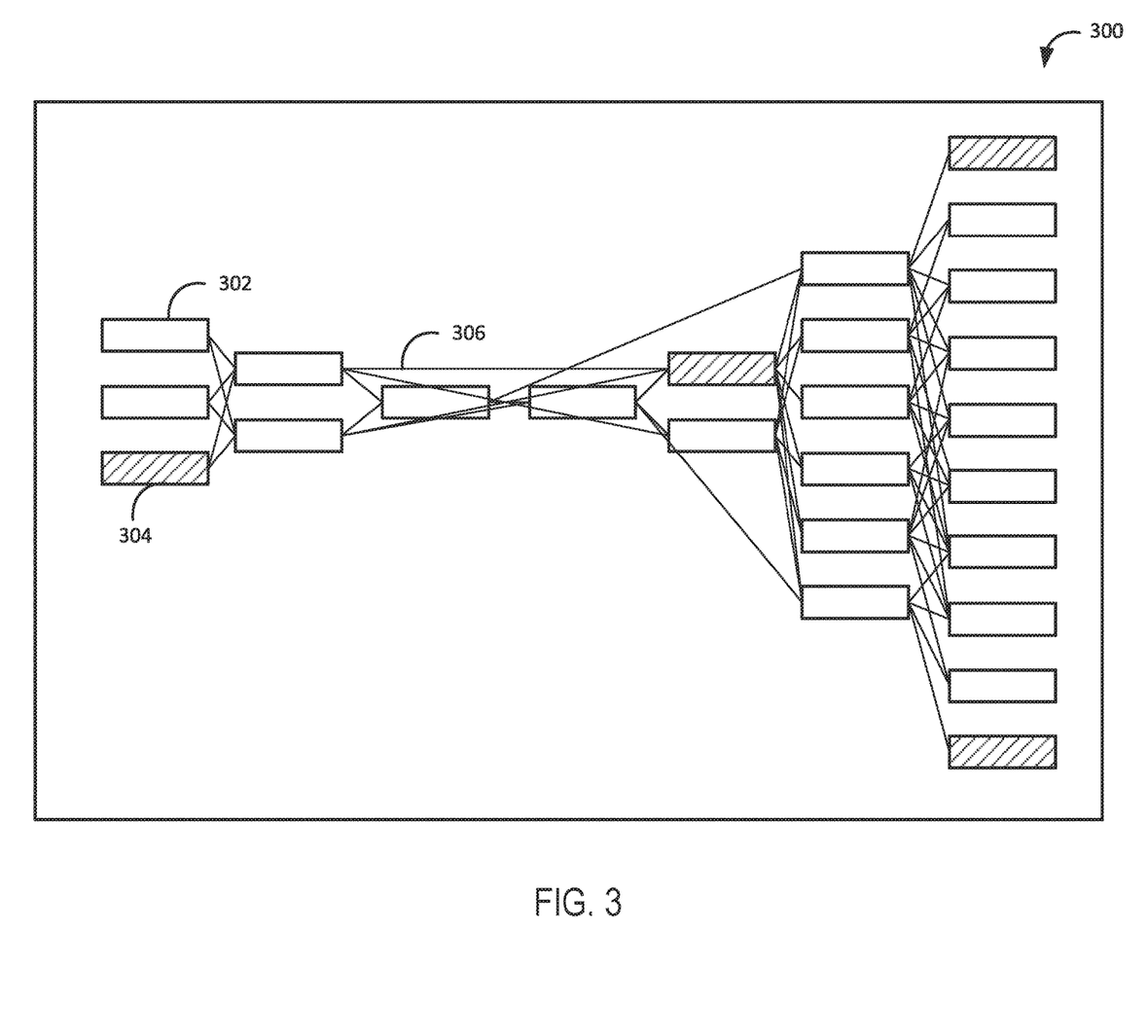
FIG. 3 illustrates examples of a GUI for presenting a deployment pipeline according to some embodiments.

In a specific implementation, in communicating with a client system, the communication engine 204 is configured to provide data for generating a graphical user interface (GUI) for presenting issues associated with datasets and/or source code associated with a deployment pipeline. In a specific implementation, the graphical user interface (GUI) may include a GUI for presenting information on datasets and/or source code on which an issue associated with one or more deployment pipeline cleaning rules has been detected. An example of such a GUI is illustrated in FIG. 3. Depending upon specifics of an implementation and other considerations, the data for generating a graphical user interface (GUI) may include graphical data (e.g., image frame data) of the GUI and/or instructions to generate the GUI.

In a specific implementation, in communicating with a client system, the communication engine 204 is configured to provide data of a deployment pipeline cleaning rule to one or more client systems associated with clients other than a client who set up the deployment pipeline cleaning rule, for sharing information on the deployment pipeline cleaning rule. In a specific implementation, the data of the deployment pipeline cleaning rule may include identifiers of parameters (e.g., scope of rule, timing to apply rule, timing to notify issues, etc.) used in the deployment pipeline cleaning rule, values of the parameters, and statistic data about amount and types of issues found by using the deployment pipeline cleaning rule and improvement achieved by addressing the found issues.

In a specific implementation, in communicating with pipeline resource repository, the communication engine 204 is configured to receive information on datasets and/or source code associated with a deployment pipeline, with respect to which deployment pipeline linting is to be performed. In a specific implementation the information on datasets and/or source code include the datasets and/or source code themselves, metadata of the datasets and/or source code, or both. In a specific implementation, in communicating with pipeline resource repository, the communication engine 204 is configured to send an instruction to modify a dataset and/or source code on which an issue violating a deployment pipeline cleaning rule has been found. Depending upon specifics of an implementation and other consideration, the instruction causes a dataset and/or a metadata of the dataset to be modified so as not to violate the deployment pipeline cleaning rule. For example, when a dataset is not compliant with a dataset naming rule, the instruction instructs to modify the name of the dataset. In another example, when source code is inactive and violates an inactive source code branch rule, the instruction causes the source code to be dissociated with the deployment pipeline and/or remove the source code from a source code repository associated with the deployment pipeline.

In a specific implementation, in communicating with a deployment pipeline implementation system, the communication engine 204 is configured to send a notification when deployment pipeline linting has been completed for a deployment pipeline to be implemented by the deployment pipeline implementation system. In a specific implementation, in communicating with a deployment pipeline implementation system, the communication engine 204 is configured to receive a notification from the deployment pipeline implementation system that deployment pipeline linting is needed for a deployment pipeline to be executed by the deployment pipeline implementation system. In a specific implementation, in receiving the notification, the communication engine 204 is configured to notify applicable engines such as the rule implementation engine 212 and the rule management engine 214, to perform operations for deployment pipeline linting.

The rule setup engine 206 is intended to represent a hardware configured to set up a deployment pipeline cleaning rule, based on which deployment pipeline linting is performed with respect to datasets and/or source code. In a specific implementation, in setting up a deployment pipeline cleaning rule, the rule setup engine 206 is configured to create a new deployment pipeline cleaning rule or modify (update) a pre-existing deployment pipeline cleaning rule to create a modified deployment pipeline cleaning rule. Further, in a specific implementation, in creating a new deployment pipeline cleaning rule, the rule setup engine 206 is configured to set up one or more parameters and parameter values thereof for a new deployment pipeline cleaning rule on its own, or import a new deployment pipeline cleaning rule with preset parameters and preset parameter values thereof from an external system, such as a client system. In a specific implementation, in setting up a deployment pipeline cleaning rule, the rule setup engine 206 is configured to set up the deployment pipeline cleaning rule based on user inputs received from applicable system such as a client system.

In a specific implementation, a deployment pipeline cleaning rule includes a plurality of types, including rules to be applied to datasets, such as a dataset naming rule and an inactive dataset rule, rules to be applied to source code, such as an inactive source code branch rule and a hanging transaction rule, and rules to be applied to repository, such as a multiple repository rule and an inactive repository rule. In a specific implementation, a rule to be applied to datasets may specify one or more valid types of dataset and/or one or more invalid types of dataset. In a specific implementation, a rule to be applied to datasets may specify valid storage location of datasets and/or invalid storage location of datasets. In a specific implementation, a dataset naming rule may specify text string and letters that can be used for naming a dataset, and/or text string and letters that cannot be used for naming a dataset. For example, a dataset naming rule may specify special character (e.g., %, $, #, etc.), specific use of capital letter, and specific use of space as violating the dataset naming rule. In a specific implementation, an inactive dataset rule may specify one or more criteria beyond which a dataset is considered to be inactive (stale). For example, the criteria to determine inactiveness of a dataset may include a time period during which the dataset has no access, frequency of accessing the dataset, and so on.

In a specific implementation, a rule to be applied to source code may specify conditions to determine whether or not a source code at a branch of a deployment pipeline is broken (inactive). In a specific implementation, an inactive source code branch rule may specify one or more criteria beyond which source code is considered to be inactive. For example, the criteria to determine inactiveness of source code may include a time period during which the source code has not been implemented, frequency of implementing the source code, and so on. In a specific implementation, a hanging transaction rule may specify one or more criteria beyond which a transaction on a pipeline resource is being considered to be excessively pending. For example, the criteria to determine excessive pending state of a transaction on source code may include a time period during which the transaction is incomplete and so on. The transaction on a source code may for example include an open transaction. Transactions may apply to datasets instead of, or in addition to, source code.

In a specific implementation, a rule to be applied to source code may specify conditions to determine whether or not mapping of source code associated with a deployment pipeline is valid (e.g., located in a proper source code repository). In a specific implementation, a multiple repository rule may specify the number of source code repository beyond which source code are considered to be excessively compartmentalized. For example, when the multiple repository rule specifies the number of acceptable source code repository to be one for a deployment pipeline project and the actual number of source code repository used for the deployment pipeline project is two, it is determined that the multiple repository rule is violated. In a specific implementation, an inactive repository rule may specify one or more criteria beyond which a source code repository is considered to be inactive. For example, the criteria to determine inactiveness of a source code repository may include a time period during which the source code repository has not been accessed, frequency of accessing the source code repository, and so on.

In a specific implementation, parameters of a deployment pipeline cleaning rule include severity, context, frequency, reporters, triggering events, and so on. In a specific implementation, severity is a parameter to set up an action to be taken when a deployment pipeline cleaning rule is violated. Depending upon specifics of an implementation and other consideration, severity may be designated by a plurality of levels. For example, severity includes a first level at which an error notification is provided, and a second level at which a warning notification is provided more acutely than the error notification. In a specific implementation, context is a parameter to set up a scope of source code on which a deployment pipeline cleaning rule is applied. Depending upon specifics of an implementation and other consideration, context may be designated by a plurality of types. For example, context includes a first context at which the deployment pipeline cleaning rule is globally applied to source code, without limiting to a specific deployment pipeline project, and a second context at which the deployment pipeline cleaning rule is specifically applied to source code associated with a specific deployment pipeline project. In a specific implementation, frequency is a parameter to set up frequency at which application of a deployment pipeline cleaning rule is implemented. Depending upon specifics of an implementation and other consideration, frequency may be designated by a period of time interval. For example, context may be designated by day (e.g., 24 hours), week (e.g., 7 days), and month (e.g., 30 days). In a specific implementation, reporters is a parameter to set up to whom a notification of violation of a deployment pipeline cleaning rule is provided. Depending upon specifics of an implementation and other consideration, reporters may be designated by a user ID, a posting location ID, or a log ID. In a specific implementation, triggering events is a parameter to set up at which application of a deployment pipeline cleaning rule is implemented. Depending upon specifics of an implementation and other consideration, triggering events may be designated by a type of event, such as a real-time user input to name a dataset, user input to instruct start of deployment pipeline linting, passage of a preset timing.

In a specific implementation, the rule setup engine 206 may also present suggestions to be compliance with a deployment pipeline cleaning rule. For example, when a dataset is generated, the rule setup engine 206 may cause the deployment pipeline cleaning rule to be applied in real-time and/or presented in real-time on a graphical user interface (GUI) of a client system, such that the generated dataset is compliant with the deployment pipeline cleaning rule. In another example, when source code is generated in real time, the rule setup engine 206 may similarly cause the deployment pipeline cleaning rule to be applied in real-time and/or presented in real-time on a graphical user interface (GUI) of a client system, such that the generated source code is compliant with the deployment pipeline cleaning rule.

In a specific implementation, the rule setup engine 206 is configured to suggest one or more deployment pipeline cleaning rules to apply to a deployment pipeline based on analysis of one more other deployment pipelines. For example, when a first deployment pipeline shares one or more datasets and/or source code with a second deployment pipeline, the rule setup engine 206 may suggest that one or more deployment pipeline cleaning rules used for the first deployment pipeline may apply to the second deployment pipeline. In another example, when a first deployment pipeline includes datasets and/or source code that have similarity with datasets and/or source code associated with a second deployment pipeline, the rule setup engine 206 may suggest that one or more deployment pipeline cleaning rules used for the first deployment pipeline may apply to the second deployment pipeline. In another example, the rule setup engine 206 may also make the suggestion based on results (e.g., successful cleaning) of applying a deployment pipeline cleaning rule to a deployment pipeline for application to other deployment pipelines.

The rule repository 208 is intended to represent a datastore configured to store one or more deployment pipeline cleaning rules set up by the rule setup engine 206. In a specific implementation, in storing one or more deployment pipeline cleaning rules, the rule repository 208 manages the stored deployment pipeline cleaning rules using a deployment pipeline cleaning rule table including a plurality of entries each of which corresponds to a deployment pipeline cleaning rule. For example, an entry of the deployment pipeline cleaning rule table includes an identification of the deployment pipeline cleaning rule, an identification of one or more parameters, parameter values of the parameters, and stored location information of the deployment pipeline cleaning rule.

The rule test engine 210 is intended to represent a hardware configured to test a deployment pipeline cleaning rule set up by the rule setup engine 206 to detect an error in the deployment pipeline cleaning rule. In a specific implementation, in testing a deployment pipeline cleaning rule, the rule test engine 210 is configured to determine whether or not the deployment pipeline cleaning rule is excessively sensitive to detect frivolous errors, enough to cause unnecessary operation delay on a deployment pipeline. In a specific implementation, in testing a deployment pipeline cleaning rule, the rule test engine 210 is configured to determine whether or not the deployment pipeline cleaning rule is excessively broad to detect almost all source code or almost all datasets as containing errors. In a specific implementation, upon determining an error in a deployment pipeline cleaning rule, the rule test engine 210 may prompt the deployment pipeline cleaning rule to be modified and/or decline to add the deployment pipeline cleaning rule to the deployment pipeline.

The rule implementation engine 212 is intended to represent a hardware configured to perform deployment pipeline linting on datasets and/or source code associated with one or more deployment pipeline projects, by applying one or more deployment pipeline cleaning rules to the datasets and/or source code. In a specific implementation, in performing deployment pipeline linting, the rule implementation engine 212 is configured to detect a triggering event to start deployment pipeline linting. In a specific implementation, includes a real-time user input in setting a name of a dataset, source code, or any other applicable object. In a specific implementation, a triggering event to start deployment pipeline linting may be different from or the same as a triggering event to apply a specific deployment pipeline cleaning rule set in a parameter thereof.

In a specific implementation, in performing deployment pipeline linting, the rule implementation engine 212 is configured to identify one or more first issues associated with one or more datasets associated with a deployment pipeline. To identify first issues, deployment pipeline cleaning rules, such as a dataset naming rule and an inactive dataset rule, may be applied to the one or more datasets associated with the deployment pipeline. Similarly, in a specific implementation, in performing deployment pipeline linting, the rule implementation engine 212 is configured to identify one or more second issues associated with source code associated with a deployment pipeline. To identify second issues, deployment pipeline cleaning rules, such as an inactive source code branch rule, a hanging transaction rule, a multiple repository rule, and an inactive repository rule, may be applied.

In a specific implementation, in performing deployment pipeline linting, the rule implementation engine 212 is configured to cause the communication engine 204 to provide a notification of the first and/or second issues to an applicable system such as a client system, such that a GUI indicating the first and/or second issues to be presented to the user. Depending on a specific implementation of the embodiments, the timing to provide the notification, the destination of the notification, and contents, of the notification may be determined based on parameters of the applied deployment pipeline cleaning rule, such as severity and reporters.

The rule management engine 214 is intended to represent a hardware configured to address (e.g., fix) the first and/or second issues identified by the rule implementation engine 212. In a specific implementation, in addressing a first issue, the rule management engine 214 is configured to automatically modify a dataset and/or metadata of a dataset causing the first issue so as not to cause the first issue. For example, the rule management engine 214 automatically modifies a naming of a dataset causing an issue of improper dataset naming violating a dataset naming rule so as not to violate the dataset naming rule. In such a case, the rule management engine 214 may cause the communication engine 204 to send an instruction to modify the dataset and/or the metadata thereof to an applicable repository, such as the pipeline resource repository discussed in this paper, to cause the modification of the dataset and/or the metadata thereof.

In a specific implementation, in addressing a second issue, the rule management engine 214 is configured to automatically and/or manually (e.g., in response to user input) modify source code and/or metadata of the source code causing the second issue so as not to cause the second issue. For example, the rule management engine 214 automatically disassociates an inactive source code branch from a deployment pipeline, such that the inactive source code is managed separately from the deployment pipeline. In such a case, the rule management engine 214 may cause the communication engine 204 to send an instruction to an applicable repository, such as the pipeline resource repository discussed in this paper, to cause the disassociation of the inactive source code branch from the deployment pipeline. In another example, the rule management engine 214 automatically removes an inactive source code branch from source code repository. In such a case, the rule management engine 214 may cause the communication engine 204 to send an instruction to an applicable repository, such as the pipeline resource repository discussed in this paper, to cause removal of the inactive source code branch from the source code repository.

FIG. 3 illustrates an example of a GUI 300 for presenting a deployment pipeline according to some embodiments. In the example shown in FIG. 3, the deployment pipeline GUI includes a plurality of blocks representing stages of a deployment pipeline, and a plurality of lines connecting blocks, each of which represents a sequence and/or dependencies of the stages of the deployment pipeline. In the example shown in FIG. 3, the plurality of blocks may be associated with pipeline resources, and each of the blocks may be rule-compliant (302) or rule-non-compliant (304). In some embodiments, the rule-compliant blocks indicate that the stage and/or pipeline resources do not violate any of one or more deployment pipeline cleaning rules, such as an inactive source code branch rule, and the rule-non-compliant blocks may indicate that the stage and/or pipeline resources violate at least one of the one or more deployment pipeline cleaning rules. In an implementation of a deployment pipeline, deployment pipeline blocks may be implemented serially from one in the leftmost region of the deployment pipeline towards the rightmost region of the deployment pipeline along lines connecting the blocks.

In some embodiments, the rule-non-compliant blocks 304 are presented differently with emphasis with respect to the rule-compliant blocks 302. Depending on a specific implementation of the embodiments, any applicable manner of emphasis can be employed to differentiate presentation of the rule-non-compliant blocks 304 from presentation of the rule-compliant blocks 302. For example, different colors, thickness of gradation colors, different patterns, different block contour lines (e.g., thickness), different block sides, different text sizes, different text thickness, and so on. In another example, different animation effects may be used to differentiate the presentation of the rule-non-compliant blocks 304 from the presentation of the rule-compliant blocks 302.

In some embodiments, the manner of presenting the rule-non-compliant blocks 304 may be further differentiated based on various applicable criteria. In a specific implementation, the manner of presenting the rule-non-compliant blocks 304 may be further differentiated based on the number of deployment pipeline cleaning rules that are violated by the rule-non-compliant blocks 304. For example, one or more rule-non-compliant stage and/or pipeline resources violating two or more deployment pipeline cleaning rules may be presented differently from one or more rule-non-compliant stage and/or pipeline resources violating one deployment pipeline cleaning rule. In a specific implementation, the manner of presenting the rule-non-compliant blocks 304 may be further differentiated based on the type of deployment pipeline cleaning rules that are violated by the rule-non-compliant blocks 304. For example, one or more rule-non-compliant blocks violating a first deployment pipeline cleaning rule may be presented differently from one or more rule-non-compliant stage and/or pipeline resources violating a second deployment pipeline cleaning rule.

Figure 4:
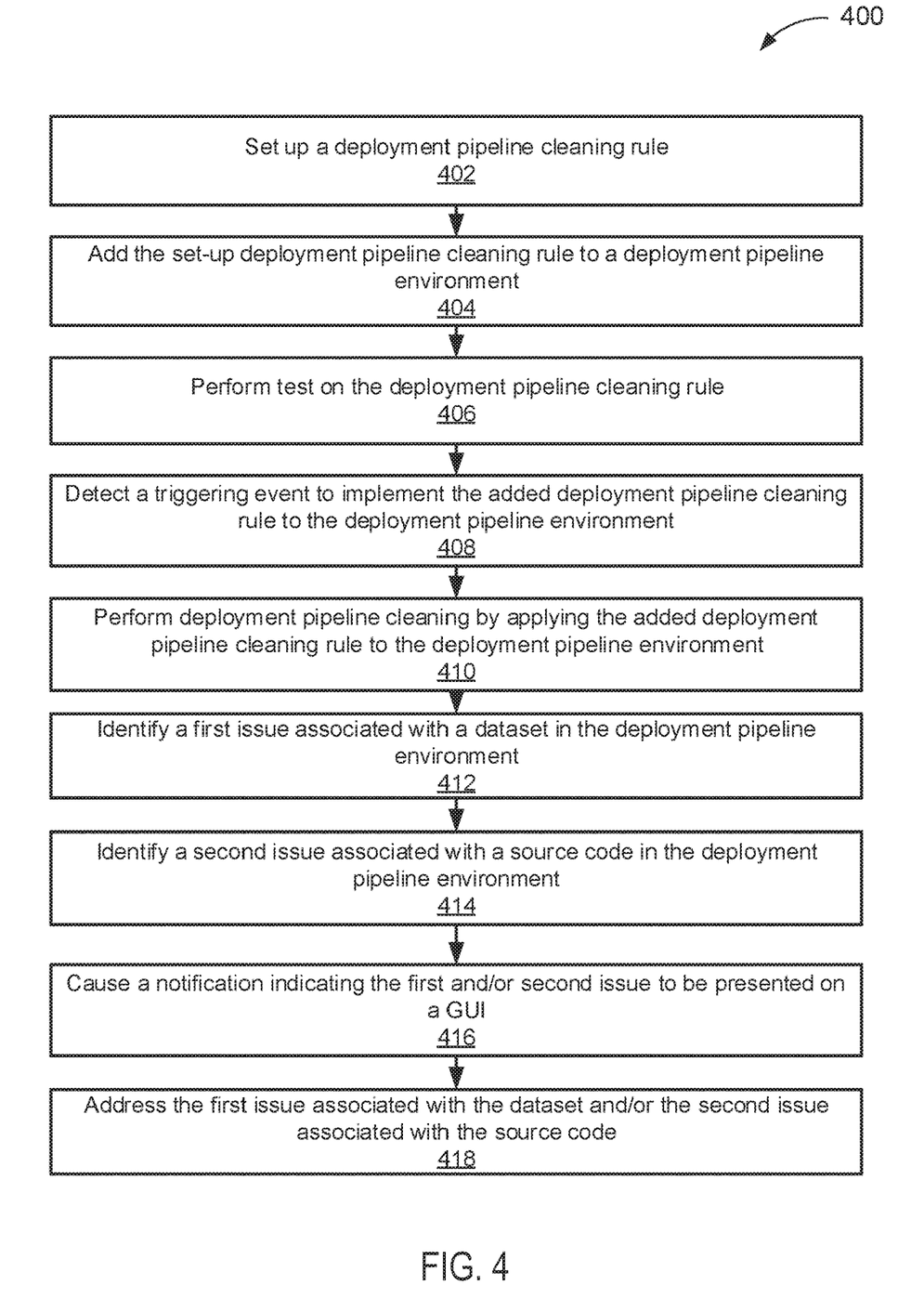
FIG. 4 is a flowchart of an example of a method for managing datasets and source code associated with a deployment pipeline according to some embodiments.

FIG. 4 is a flowchart 400 of an example of a method for managing datasets and source code associated with a deployment pipeline according to some embodiments. This flowchart described in this paper illustrate modules (and potentially decision points) organized in a fashion that is conducive to understanding. It should be recognized, however, that the modules can be reorganized for parallel execution, reordered, modified (changed, removed, or augmented), where circumstances permit.

In module 402 of FIG. 4, a deployment pipeline cleaning rule is set up. An applicable engine for setting up a deployment pipeline cleaning rule, such as the rule setup engine 206 in FIG. 2, sets up a deployment pipeline cleaning rule. In a specific implementation, in setting up a deployment pipeline cleaning rule, the deployment pipeline cleaning rule may be newly created, created as a modification of a pre-existing deployment pipeline cleaning rule, or revoked. In a specific implementation, the set-up deployment pipeline cleaning rule is stored in applicable datastore such as the rule repository 208 in FIG. 2.

In module 404 of FIG. 4, a set-up deployment pipeline cleaning rule is added to a deployment pipeline environment. An applicable engine for adding a set-up deployment pipeline cleaning rule to a deployment pipeline environment, such as the rule setup engine 206 in FIG. 2, adds the set-up deployment pipeline cleaning rule to the deployment pipeline environment. In a specific implementation, in adding a deployment pipeline cleaning rule to a deployment pipeline environment, a scope of applying the deployment pipeline cleaning rule, such as attributes of source code, datasets, transactions, and so on, is determined. In a specific implementation, in adding a deployment pipeline cleaning rule to a deployment pipeline environment, timing (e.g., triggering event) of applying the deployment pipeline cleaning rule, such as real-time, periodical, manual input, and so on, is determined.

In module 406 of FIG. 4, a test is performed on a deployment pipeline cleaning rule, so as to examine whether the deployment pipeline cleaning rule properly performs an intended linting on a deployment pipeline. An applicable engine for testing a deployment pipeline cleaning rule, such as the rule test engine 210 in FIG. 2, tests the deployment pipeline cleaning rule. In a specific implementation, in testing a deployment pipeline cleaning rule, whether or not the deployment pipeline cleaning rule is excessively sensitive to detect frivolous errors, enough to cause unnecessary operation delay may be determined. In a specific implementation, in testing a deployment pipeline cleaning rule, whether or not the deployment pipeline cleaning rule is excessively broad to detect almost all source code or almost all datasets as containing errors is determined.

In module 408 of FIG. 4, a triggering event to implement an added deployment pipeline cleaning rule to the deployment pipeline environment is detected. An applicable engine for detecting a triggering event to implement an added deployment pipeline cleaning rule to the deployment pipeline environment, such as the rule implementation engine 212 in FIG. 2, detects the triggering event. In a specific implementation, the triggering event includes a real-time user input in setting a name of a dataset, source code, or any other applicable object. In a specific implementation, the triggering event includes a user input to start deployment pipeline cleaning. In a specific implementation, the triggering event includes passage of a preset timing.

In module 410 of FIG. 4, deployment pipeline cleaning is performed by applying an added deployment pipeline cleaning rule to the deployment pipeline environment. An applicable engine for performing deployment pipeline cleaning, such as the rule implementation engine 212 in FIG. 2, performs the deployment pipeline cleaning by applying the added deployment pipeline cleaning rule to the deployment pipeline environment. In a specific implementation, a deployment pipeline cleaning rule includes one or more of a dataset naming rule, an inactive dataset rule, an inactive source code branch rule, a hanging transaction rule, a multiple repository rule, and an inactive repository rule.

In module 412 of FIG. 4, a first issue associated with a dataset in a deployment pipeline environment is identified. An applicable engine for identifying a first issue associated with a dataset in the deployment pipeline environment, such as the rule implementation engine 212 in FIG. 2, performs an operation to identify the first issue associated with a dataset. In a specific implementation, a first issue associated with a dataset may include improper naming of a dataset, which does not conform to a predetermined naming standard indicated by a dataset naming rule of a deployment pipeline cleaning rule. For example, the improper naming of a dataset may include use of special character (e.g., %, $, #, etc.), use of space within a single character string, use of capital letter, and so on.

In module 414 of FIG. 4, a second issue associated with source code in the deployment pipeline environment is identified. An applicable engine for identifying a second issue associated with source code in the deployment pipeline environment, such as the rule implementation engine 212 in FIG. 2, performs an operation to identify the second issue associated with source code. In a specific implementation, a second issue associated with source code may include non-use of source code branches over a predetermined period of time, which may be indicated by an inactive source code branch rule of a deployment pipeline cleaning rule. In a specific implementation, a second issue associated with source code may include multiple storage of multiple branch source code associated with a single project, which may be indicated by a multiple repository rule of a deployment pipeline cleaning rule.

In module 416 of FIG. 4, a notification indicating the first and/or second issue is caused to be presented on a GUI. An applicable engine for causing the first and/or second issue to be presented on a GUI, such as the communication engine 204 in FIG. 2, provides data for the GUI for presenting the first and/or second issue to an applicable system such as a client system described in this paper, such that the GUI is presented through the applicable system.

In module 418 of FIG. 4, the first issue associated with the dataset and/or the second issue associated with the source code is addressed to handle the issue. An applicable engine for addressing the first issue associated with the dataset and/or the second issue associated with the source code, such as the rule management engine 214 in FIG. 2, addresses the first and/or second issue. In a specific implementation, in addressing a first issue, a dataset and/or metadata of the dataset causing the first issue is automatically modified so as not to cause the first issue. For example, a naming of a dataset causing an issue of improper dataset naming violating a dataset naming rule is automatically modified so as not to violate the dataset naming rule. In a specific implementation, in addressing a second issue, source code and/or metadata of the source code causing the second issue is automatically modified so as not to cause the second issue. For example, an inactive source code branch is disassociated from a deployment pipeline, and managed separately from the deployment pipeline. In another example, an inactive source code branch is removed from source code repository.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows 10, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

FIG. 5 is a block diagram that illustrates a computer system 500 upon which any of the embodiments described herein, such as a deployment pipeline implementation system, pipeline resource repository, a client system, and a deployment pipeline linting system, may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
one or more processors; and
memory storing instructions that, when executed by the one or more processors, cause the system to perform:
obtaining a deployment pipeline, the deployment pipeline being associated with one or more datasets and source code, the source code being associated with the one or more datasets;
obtaining deployment pipeline cleaning rules;
applying the deployment pipeline cleaning rules to the deployment pipeline, wherein the deployment pipeline cleaning rules include a dataset naming rule that specifies text strings or letters used for naming a dataset and an inactive source code branching rule that specifies a time period during which a branch of source code has been inactive;
identifying one or more first issues associated with at least one dataset of the one or more datasets associated with the deployment pipeline, the identifying based on the applying the deployment pipeline cleaning rules to the deployment pipeline;
identifying one or more second issues associated with the source code associated with the deployment pipeline, the identifying based on the applying the deployment pipeline cleaning rules to the deployment pipeline; and
modifying at least one issue of the one or more first issues and at least one issue of the one or more second issues to be compliant with the deployment pipeline cleaning rules.

2. The system of claim 1, wherein the one or more first issues associated with the at least one dataset include any of an invalid dataset name, an invalid data type, or stale data.

3. The system of claim 1, wherein the one or more second issues associated with the source code include any of broken branches or invalid mapping of the source code within the deployment pipeline.

4. The system of claim 1, wherein the instructions further cause the system to perform:
updating at least one of the deployment pipeline cleaning rules in response to a user input.

5. The system of claim 1, wherein the instructions further cause the system to perform:
creating additional deployment pipeline cleaning rules in response to a user input.

6. The system of claim 1, wherein any of the first or second issues are identified periodically or in real-time.

7. The system of claim 1, wherein the instructions further cause the system to perform:
suggesting the deployment pipeline cleaning rules to apply to the deployment pipeline based on analysis of other deployment pipelines.

8. The system of claim 1, wherein the instructions further cause the system to perform:
testing the deployment pipeline cleaning rules; and
modifying at least one of the deployment pipeline cleaning rules based on a test result.

9. The system of claim 1, wherein the instructions further cause the system to perform:

fixing the one or more first issues and the one or more second issues.

10. The system of claim 1, wherein the instructions further cause the system to perform:
  detecting an event to triggering deployment pipeline cleaning; and
  applying the deployment pipeline cleaning rules to the deployment pipeline upon detection of the event, the event including at least one of a real-time user input to name a dataset, a user input to start the deployment pipeline cleaning, and passage of a preset timing.

11. The system of claim 1, wherein the instructions further cause the system to perform:
  disassociating, from the deployment pipeline, the branch of source code determined to be inactive.

12. A computer implemented method performed on a computer system having one or more processors programmed with computer program instructions that, when executed by the one or more processors, cause the computer system to perform the method, the method comprising:
  obtaining a deployment pipeline, the deployment pipeline being associated with one or more datasets and source code, the source code being associated with the one or more datasets;
  obtaining deployment pipeline cleaning rules;
  applying the deployment pipeline cleaning rules to the deployment pipeline wherein the deployment pipeline cleaning rules include a dataset naming rule that specifies text strings or letters used for naming a dataset and an inactive source code branching rule that specifies a time period during which a branch of source code has been inactive;
  identifying one or more first issues associated with at least one dataset of the one or more datasets associated with the deployment pipeline, the identifying based on the applying the deployment pipeline cleaning rules to the deployment pipeline;
  identifying one or more second issues associated with the source code associated with the deployment pipeline, the identifying based on the applying the deployment pipeline cleaning rules to the deployment pipeline; and
  modifying at least one issue of the one or more first issues and at least one issue of the one or more second issues to be compliant with the deployment pipeline cleaning rules.

13. The method of claim 12, wherein the one or more first issues associated with the at least one dataset include any of an invalid dataset name, an invalid data type, or stale data.

14. The method of claim 12, wherein the one or more second issues associated with the source code include any of broken branches or invalid mapping of the source code within the deployment pipeline.

15. The method of claim 12, further comprising:
  updating at least one of the deployment pipeline cleaning rules in response to a user input.

16. The method of claim 12, further comprising:
  creating additional deployment pipeline cleaning rules in response to a user input.

17. The method of claim 12, wherein any of the first or second issues are identified periodically or in real-time.

18. The method of claim 12, further comprising:
  suggesting the deployment pipeline cleaning rules to apply to the deployment pipeline based on analysis of other deployment pipelines.

19. The method of claim 12, further comprising:
  testing the deployment pipeline cleaning rules; and
  modifying at least one of the deployment pipeline cleaning rules based on a test result.

20. The method of claim 12, further comprising:
  detecting an event to triggering deployment pipeline cleaning, wherein the deployment pipeline cleaning rules are applied to the deployment pipeline upon detection of the event, the event including at least one of a real-time user input to name a dataset, a user input to start the deployment pipeline cleaning, or passage of a preset timing.

* * * * *